130.)  2 Sheets--Sheet 1.
JAMES T. BAGGS.
Improvement in Sawing Machines.
No. 122,695.  Patented Jan. 16, 1872.
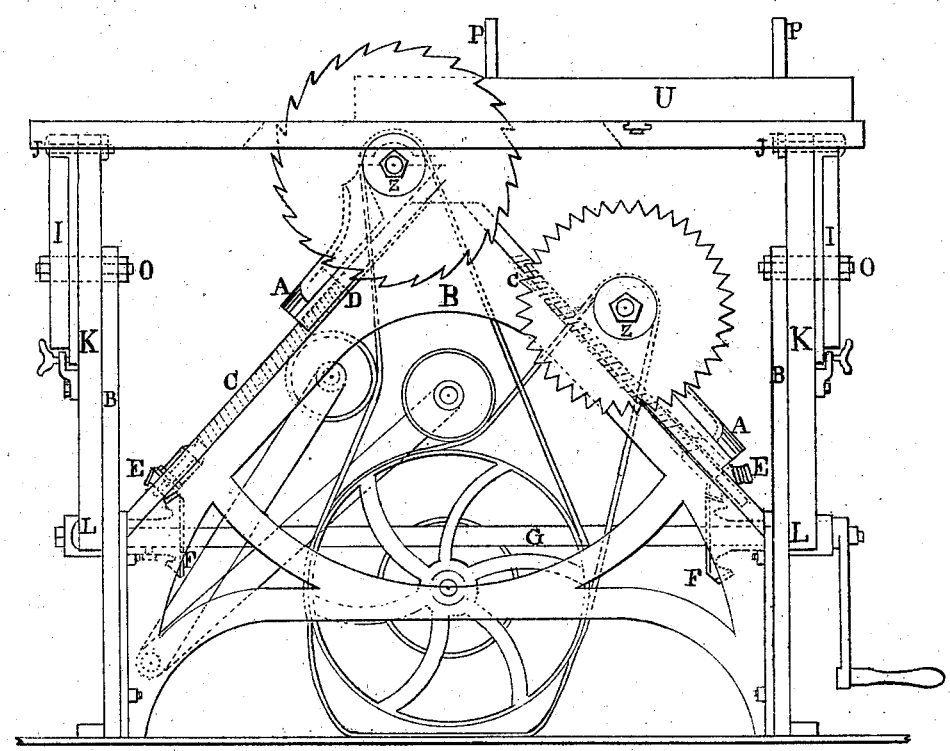
Attest  
R H Clayland  
A H Martin
Inventor  
James T. Baggs (130.)
JAMES T. BAGGS.
Improvement in Sawing Machines.
No. 122,695.
Patented Jan. 16, 1872.
2 Sheets--Sheet 2.
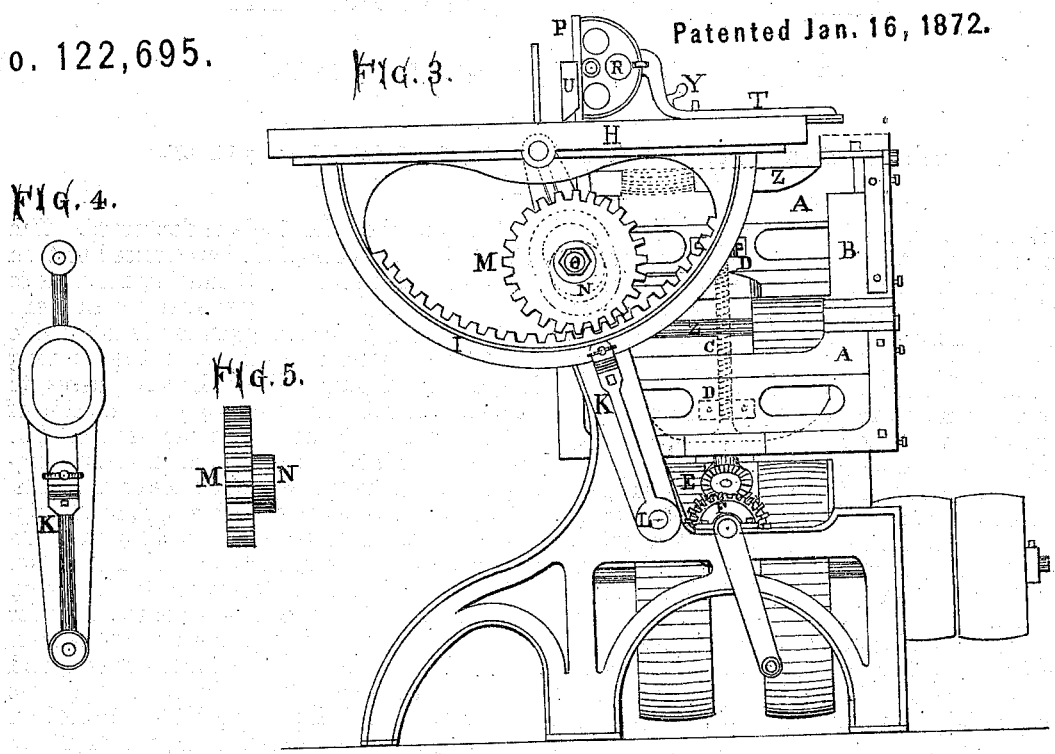
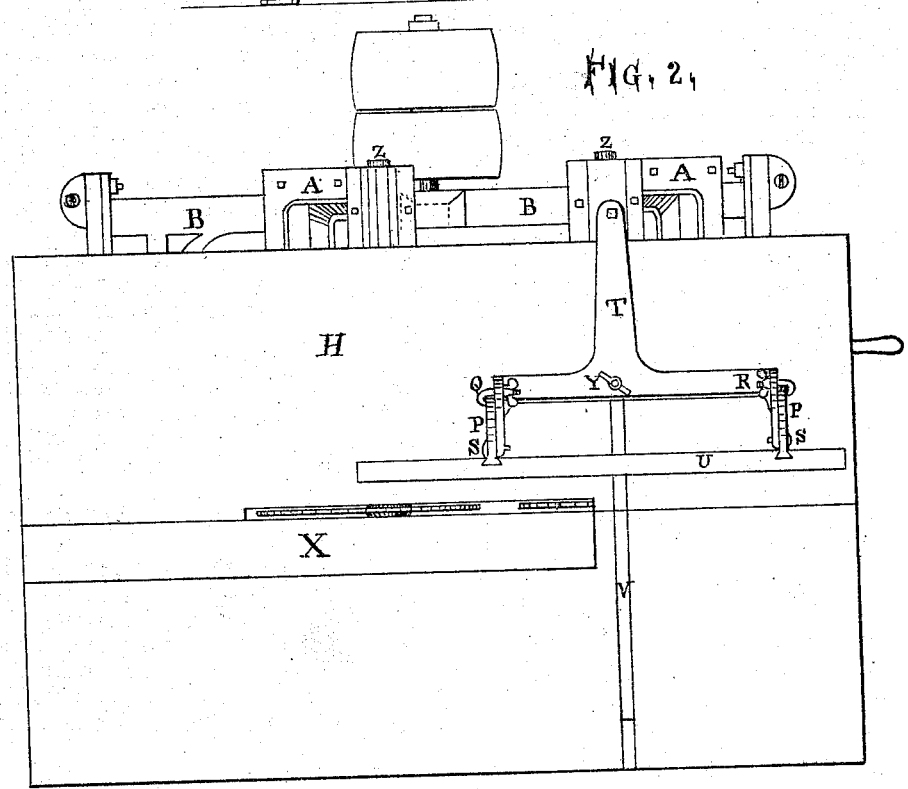

UNITED STATES PATENT OFFICE.

JAMES T. BAGGS, OF BRIDGEPORT, OHIO.

IMPROVEMENT IN SAWING-MACHINES.

Specification forming part of Letters Patent No. 122,695, dated January 16, 1872.

*To all whom it may concern:*

Be it known that I, JAMES T. BAGGS, of Bridgeport, in the county of Belmont and State of Ohio, have invented a new and Improved Sawing-Machine; and I do hereby declare that the following is a full, clear, and exact description thereof, which will enable others skilled in the art to make and use the same, reference being had to the accompanying drawing forming a part of this specification.

My invention relates to that class of sawing-machines in which two or more saws are operated in the same machine; and is also arranged so that jointing or molding heads may be substituted; and consists in certain improvements hereinafter described and specified in the claim.

Figure 1 is a side elevation of my improved machine. Fig. 2 is a plan view. Fig. 3 is an end elevation; and Fig. 4 is a view of arm K detached. Fig. 5 is an edge view of cog-wheel M and eccentric N.

The saw-arbors are mounted in sliding frames A A, which are fitted to slide up and down on the sides of a triangular frame, B, the arbor Z being made so that jointing or other heads may be substituted for different kinds of work, or a wabble-saw (suitable collars being provided for the same) for plowing, rabbeting, &c. C represents adjusting-screws, journaled in cross-section of frame B and screwing through nuts D, the same being attached to sliding frames A A. The screws C are provided with bevel-gears E engaging with gears F on shaft G, which extend from end to end of the frame, and is provided with a hand-crank for turning the same to change the position of or to adjust the saws or heads to different heights through the table. The table H is screwed to and rests upon a cross-section of semicircular cogged table-bearers I, the same being hung to turn on bolts J on the arms K. The arms K are hung to vibrate on bolts L, the bolts L being secured to the ends of frame B. M is a cog-wheel, the teeth engaging with the teeth of bearers I. N is an eccentric attached to the back of the cog-wheel M, and extending through the opening in arm K. The wheels M and eccentrics N oscillate on stud-bolts O O, the same being set in the ends of the frame, and operate as follows, when the table is depressed: The wheels M and eccentrics N are caused to turn on bolts O, the eccentric N causing the arms to move backward, carrying the table with them.

The object of this arrangement is to provide for the automatic adjustment of the opening in the table through which the saw passes, to prevent the table from binding on the side of the saws when the same is being depressed to any required inclination, the center of the hinging bolts J being below the surface of the table.

The gauge consists of a clamp, T, for clamping to the slide V, the same working in a corresponding groove in the table. There are two semicircular disks, P P, pivoted to the clamp T, by means of bolts S S, so as to stand either in a vertical or oblique plane and be held in position by hook-bolts and thumb-nuts Q and R. The guide-plate U has dovetailed grooves working over corresponding slides formed on the straight sides of disks P P, which allows it to slide down and rest in contact with the table at whatever inclination it may be set. The guide-plate may also be readily removed and different ones substituted for different kinds of work. When the gauge is set to the required size it is held in place by the thumb-screw Y, screwing through the slide V and pressing against the bottom of groove in the table. X shows a slide, to be drawn out when jointing or molding heads are used. The front leaf of the table is fitted to slide, and can be used for cross-cutting short lumber, either square or on any one or two angles required.

Having thus described my invention, what I claim as new, and desire to secure by Letters Patent, is set forth in the following claims.

I do not claim, broadly, a machine having two saws, for they have been used before; but—

What I claim as new, and of my own invention, is—

1. The cogged table-bearers I, wheels M, eccentrics N, and arms K, in combination with the frame B B, carrying the saw-arbors Z Z, constructed as and for the purpose specified.

2. The clamp T, perforated disks P P, hook-bolts Q R, guide-plate U, and slide V, in combination with the table H and the set or thumb-screw Y, arranged and operating substantially as and for the purpose set forth.

3. The stationary frame B, sliding frames A A, the saw-arbors Z Z, screws C C, bevel-gearing E F, and horizontal shaft G, in combination with the table H and cogged table-bearers I, wheels M, eccentrics N, and arms K, all constructed and arranged to operate substantially as and for the purpose set forth.

JAMES T. BAGGS.

Witnesses:
R. H. CLAYLAND,
ROBT. J. BAGGS.

(130)